April 16, 1957 TOMOMI MURAKAMI ET AL 2,789,227

TUNING MEANS FOR MULTIPLE-BAND SIGNAL RECEIVING SYSTEMS

Filed May 27, 1953

INVENTORS
Tomomi Murakami &
John C. Achenbach

BY H. L. Newton

ATTORNEY

United States Patent Office 2,789,227

Patented Apr. 16, 1957

2,789,227

TUNING MEANS FOR MULTIPLE-BAND SIGNAL RECEIVING SYSTEMS

Tomomi Murakami and John C. Achenbach, Haddonfield, N. J., assignors to Radio Corporation of America, a corporation of Delaware Application May 27, 1953, Serial No. 357,687

13 Claims. (Cl. 250—40)

This invention relates in general to selective tuning means for multiple-band signal receiving systems and the like, and in particular to turret-type tuners for television signal receiving systems.

Initially two very high frequency (V. H. F.) bands were allocated for the broadcast transmission and reception of television signals. These bands presently extend from 54 to 88 megacycles (mc.) and from 174 to 216 mc., accommodating television channels 2 to 6 and 7 to 13 respectively. To conveniently and accurately tune a television receiver to the available channels within these frequency bands, several different tuning systems have been proposed and used commercially. Among these tuning systems the turret-type tuner is considered favorably and is extensively used.

A turret-type tuner may comprise in general a rotary drum-type turret tuning structure having a series of rotatably selectable segments, each carrying circuit elements providing tuned signal selecting and converting circuits for a particular signal channel. The segments are affixed to the periphery of the drum-type turret tuning structure which is rotatable by means of a tuning or band change control shaft. The circuit elements, including tuning inductors and capacitors, are affixed to one surface of each of the segments which are in the form of planar insulating strips or forms. These elements may be printed or photoengraved on the surface of the segments or they may comprise small individual inductance coils and capacitors which are physically mounted on the surface of the segments. The drum structure of such a tuner may be divided into shielded compartments in which the segments are suitably mounted. Accordingly, for V. H. F. reception the drum may be divided into twelve equal compartments, one for each of the V. H. F. channels.

By rotating the tuning shaft of a turret-tuner of the type hereinbefore described, the tuning elements of the selected segment corresponding to one of the signal channels, is placed in circuit with various predetermined signal amplifying and converting stages of the receiver system. It is in this manner that the frequency response characteristic of the receiver may selectively be changed in accordance with the particular channel which is desired. Such a tuning system has been found to be accurate, reliable, and easy to operate.

Recently an ultra high frequency (U. H. F.) band of frequencies has been allocated for the transmission and reception of television signals, in addition to the two V. H. F. bands already in existence. This band extends from 470 to 890 mc. and accommodates 70 new signal channels (14 to 83). This extension of the allocated television frequency bands makes available one or more U. H. F. channels in addition to the presently existing V. H. F. channels in many areas. In other areas it will permit television reception for the first time. While this extension of the commercially available television signal channels has many advantages, these advantages may not be realized without overcoming certain technical problems and difficulties.

For combined V. H. F. and U. H. F reception the turret-type tuner of the general type hereinbefore described may be used to advantage by adding one or more shielded compartments to the drum structure. Suitable U. H. F. segments may then be mounted in the compartments. These segments, of insulating material, may have either printed tuning elements or small tuning inductors and capacitors mounted on their surface in a manner similar to the V. H. F. segments. Thus, depending only on size limitations, one or more U. H. F. segments may be added to the turret.

The adaption of the turret-type tuner for these purposes has proven to be a comparatively simple solution to the problem of combined V. H. F. and U. H. F. reception in a single receiver. In order to achieve completely satisfactory signal reception within the U. H. F. band of frequencies using a turret-type tuner, however, certain adaptations and changes of the V. H. F. tuning segments were found necessary. It was found, for example, that it was difficult to maintain a substantially constant bandwidth over the U. H. F. band of frequencies for a given segment using conventional coupling means between tuned circuits. In order to achieve improved signal reception it is necessary to maintain substantially constant bandwidth within relatively narrow limits over the band of operating frequencies.

Accordingly, it is an object of the present invention to provide an improved rotary turret-type tuning means for the reception of both U. H. F. and V. H. F. television signals in a plurality of predetermined signal channels.

It is a further object of the present invention to provide an improved turret-type tuner for television receivers and the like which can readily be adapted for the reception of U. H. F. as well as V. H. F. television signals in a plurality of predetermined signal channels.

It is still another object of the present invention to provide an improved turret-type tuner for high frequency signal receivers, wherein the bandwidth of the frequency response is substantially constant over the full range of U. H. F. signals.

It is a still further object of the present invention to provide an improved U. H. F. tuning segment or tuning unit for turret-type television tuners and the like.

In a presently preferred commercial embodiment of the invention, a single turret-type multiple channel television tuner is used for both U. H. F. and V. H. F. reception. The tuning inductance coils and capacitors for both the V. H. F. and U. H. F. channels are physically mounted on one surface of the various insulated segments which cover the compartments. To maintain substantially constant bandwidth over the U. H. F. band of signal frequencies, to be received in accordance with the invention, a plurality of ground contacts or shorting bars are mounted on the said one surface of the various segments and adapted to contact with the sides or edges of the radial shield walls of the turret compartments.

Mutual magnetic coupling between coils is augmented by coupling through the shield walls and shorting bars with spacings and locations so established that the frequency characteristic (because of distributed constants) of this coupling tends to maintain constant bandwidth over a wide range of frequencies.

The coupling loops through the shorting bars and shields involve relatively long paths and inductances for the signal frequencies, and it may be assumed that they are not matched transmission lines, so these coupling loops may have a frequency characteristic that results in substantially a constant bandwidth.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing, in which:

Figures 2, 4:
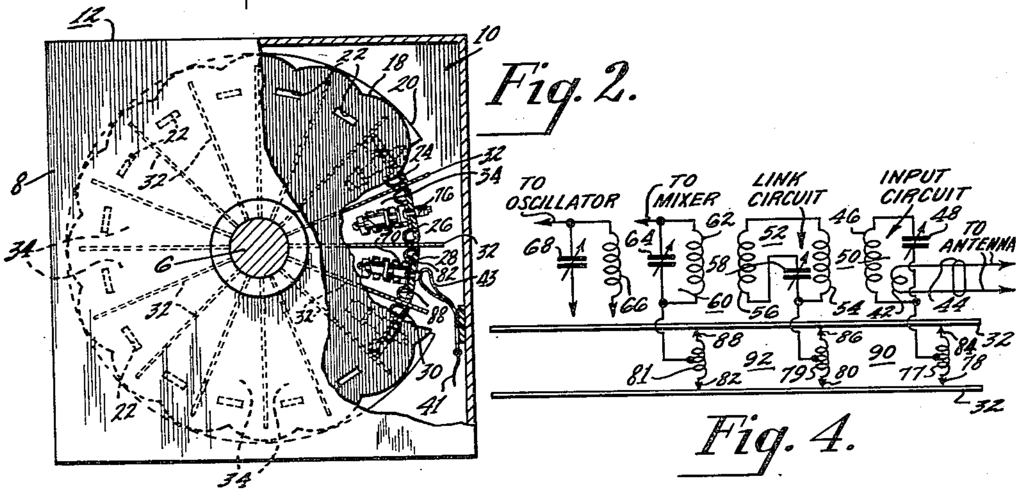
Fig. 2 is an end view, partly in cross section taken on line 2—2 of the tuner shown in Figure 1, with the cover portion partly broken away to show interior details of the tuner as provided in accordance with the invention.
Figure 3:
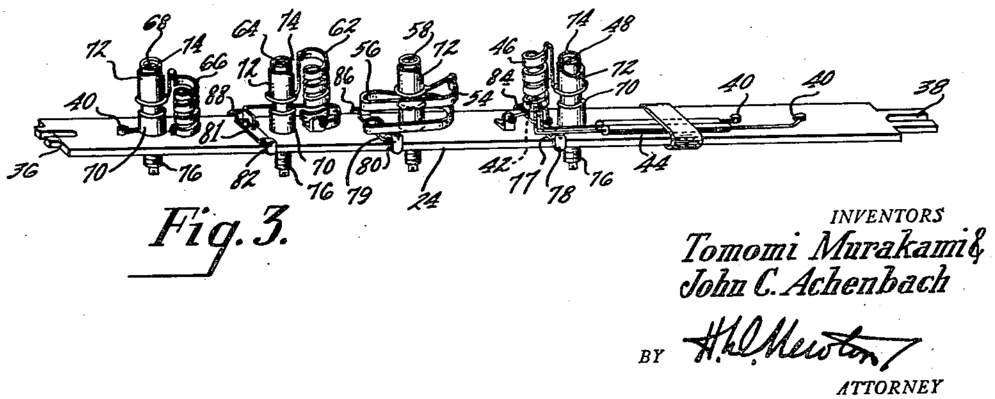

Fig. 3 is a side view, in perspective of a U. H. F. tuning segment for the tuner of Figures 1 and 2, constructed in accordance with the invention; and Fig. 4 is an equivalent schematic circuit diagram of the U. H. F. segment shown in Fig. 3.

Figure 1:
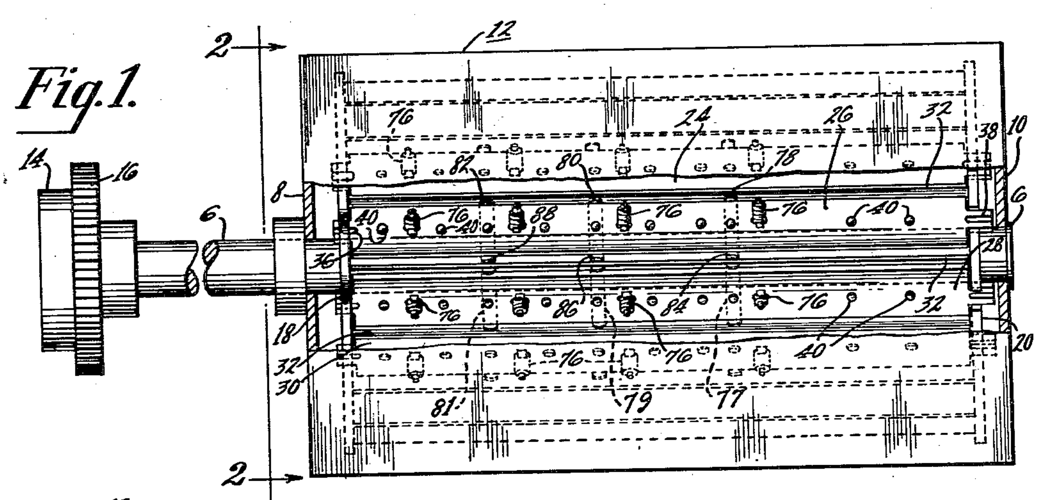
Fig. 1 is a side view, in elevation and partly in section with a cover portion broken away to show interior details, of a multi-channel turret-type tuner for television receivers and the like embodying the invention.

Referring now to the drawing, wherein like elements are designated by like reference numerals throughout the figures, and particularly to Figures 1 and 2, the turret-type tuner is provided with a rotary tuning or band control shaft 6, suitably journalled between two end members 8 and 10 of a rectangular closed tuner housing or casing 12. A manual tuning-control knob 14 affixed to the shaft and a fine tuning control knob 16 loosely mounted thereon are provided at one end of the shaft 6.

Inside the housing 12 and rigidly supported adjacent opposite ends of the shaft 6 are two thin flat support discs or end plates 18 and 20 for the turret drum structure. Distributed circumferentially around the discs on equal radii adjacent the disc peripheries are a series of locking slots 22 (Fig. 2), corresponding to the number of segments on the turret.

A series of equally spaced metallic shield members 32 extend radially from the shaft 6 and are supported thereon. The shield members 32 also extend longitudinally along the length of shaft 6 between the end discs 18 and 20. The shield members serve to divide the area inside the turret or drum into a plurality of equal compartments 34 thus providing shielding between the various tuning elements carried by the segments of the turret.

Each of the compartments 34 is closed by a tuning segment 24, 26, 28 and 30 for example, which comprise thin planar insulating strips as base elements therefor, to support the tuning elements, contacts and connection means. The segments 24, 26, 28 and 30 are supported between the end discs 18 and 20 and are locked securely in place by the tabs 36 (Figure 3) which fit into the slots 22 at opposite ends of the turret structure. Each of the segments has a series of contacts 40 which extend radially outwardly from the outside surface of the segments. The contacts 40 are used for switching connection with external circuits as will be hereinafter explained in more detail.

Extending radially inwardly from and mounted on the inside surface of each of the segments are a series of tuning elements, one segment being shown in more detail in Figure 3 and schematically as to electrical circuitry in Figure 4 and representing a tuning segment for one of the U. H. F. channels. Referring to Figures 3 and 4, incoming signals are inductively coupled from a source such as an antenna circuit, to the input tuned circuit for this U. H. F. channel segment, by means of a two turn inductive loop 42 which terminates a short transmission line 44 and is located inside and inductively coupled to a tuning inductance coil 46. The transmission line is coupled to an antenna or other signal supply circuit when the turret is rotated into a position whereby the contacts 40 are connected with the external circuit (not shown). Connected with the coil 46 is a variable capacitor 48, the combination forming a tuned circuit 50 as shown by the equivalent circuit diagram of Figure 4. An interstage tuned circuit 52 comprises tuning inductors, 54 and 56, and a tuning capacitor 58. As shown in Figure 3, the inductors 54 and 56 may comprise a continuous wire strap which is wound to provide two turns surrounding the capacitor 58. The inductor 46 of the input circuit 50 is reactively coupled to the inductor 54 of the interstage tuned circuit 52. The tuned circuit for the receiver mixer circuit is indicated generally at 60 (Fig. 4) and comprises a tuning inductor 62 and a tuning capacitor 64. The inductor 62 is reactively coupled to the inductor 56 of the interstage tuned circuit 52. The tuned circuit for the oscillator of the external circuit comprises an inductor 66 and a capacitor 68.

Each of the capacitors 48, 58, 64, and 68 comprises a pair of conducting bands, 70, 72 which are supported on an insulated form 74. Inside the form 74 is a metallic tuning core or slug 76, one end of which may be slotted as shown. The core is provided with a screw thread as shown, which engages the interior of the form. By changing the position of the core 76 by rotation within the form, the capacitance of the capacitor is changed as the core enters the space within the conducting bands 70 and 72 which are electrodes of the tuning capacitor in each case. Thus the resonant frequency of each of the resonant circuits is adjusted. By using an appropriate tool which engages the slot of the cores this adjustment can be made relatively easily. As shown in Figures 1 and 2 the slotted ends of the cores extend outwardly from the outer surface of each of the strips, further simplifying adjustments of the resonant circuits.

When the various segments are locked between the discs 18 and 20 and the proper adjustments are made the tuner operates as a continuous step-type or turret. By turning the control knob 14, the contacts 40 and others shown, of each particular segment, are brought into electrical contacts with the corresponding contacts of the external circuit. These external circuits represented by the connection 41 (Figure 2) and fixed insulated contacts represented by the contact element 43 (Figure 2) may be located in any position relative to the housing 12 which facilitates selective contact with the contacts 40, and others, of the tuning segments.

In the example illustrated, the tuner is divided into sixteen equal compartments 34. Thus, by way of example, twelve V. H. F. tuning segments, each corresponding to one of the respective channels 2 to 13, and four selected U. H. F. channels may be accommodated. By merely removing one or more of the segments and substituting therefor different segments the particular channel combination which the tuner will accommodate may be changed. Accordingly, any one of the total of 83 allocated channels may be accommodated in combination with fifteen other channels. It is obvious that if desired the tuner may be divided into fewer or more compartments depending on size limitations, sixteen compartments being preferred for present application.

It has been found that the hereinbefore described V. H. F.-U. H. F. tuning system is subject to variations in bandwidth as the system is selectively tuned over the U. H. F. band. It has also been found that these variations may be reduced and substantially eliminated by modifying the reactive coupling between the tuned circuits of the tuning segments. Accordingly, in accordance with the novel features of the present invention, a plurality of spaced conductive shorting bars 77, 79 and 81 having end contacting elements or fingers 78, 80, 82, 84, 86 and 88 are mounted on the tuning segments transversely thereof in positions wherein the fingers make intimate contact with the edges of adjacent shielding elements 32.

Referring further to Figure 3, the conductive bars 77, 79 and 81 are positioned, as shown, in close proximity to the coil 46, the coil 56, and the capacitor 64 respectively. The segment 24 may, by way of example, be used for any one of the channels 14 to 55 in the U. H. F. band, the particular channel depending on the precise adjustment of the several capacitors. As was hereinbefore explained, this adjustment is achieved by moving the several cores 76 relative to the outer conducting bands 70, 72. It is in this manner that the resonant frequency of each of the tuned circuits may be varied. For the channels 14 to 55 (470 to 722 mc.) it has been found that the band-width is most nearly constant over this range of frequencies when the conductive bars 77, 79 and 81 are positioned as shown in Figure 3. Obviously, however, the bars may be moved to any desired position and spacing on the segment 24, depending on the coupling requirements.

Although the transverse bars have been illustrated as being mounted in a fixed position on the segment 24 (as being soldered) they may be mounted on the segments in other spaced relation to facilitate adjustments relative to the circuit elements. In this manner the coupling between the tuned circuits may be varied over a fairly wide range of frequencies.

Referring now to Figures 1 and 2 the segments 24, 26, 28 and 30 are shown mounted in the turret housing between the end discs 18 and 20. In this position the contacting fingers 78, 80, 82, 84, 86 and 88 contact the sides of the shield members 32. As illustrated in these figures each of the contacting fingers is in contact with the pair of adjacent shield members between which the particular segment is mounted.

The equivalent circuit diagram for the segment 24 in its mounted position in the turret is illustrated in Figure 4 as hereinbefore noted. Because of their proximity to each other there is both inductive and capacitive coupling between the tuned circuits 50 and 52 and between the tuned circuits 52 and 60. This coupling may be modified by the novel features of the present invention.

The shorting bars 77, 79 and 81 are equivalent to inductors at higher frequencies as indicated in Figure 4. Thus in their mounted positions they form two inductive loops 90, 92 in combination with the shield members 32 which are conductors. Any current that flows through the bar 77, therefore, will flow along the shield member 32 and through the bars 79 and 81. Inductive loops such as the loops 90, 92 will vary the inductive coupling between the tuned circuits. Thus, by forming two or more such loops by use of the contacting fingers and the sides of the shield members 32 and by properly locating those fingers relative to the tuned circuits total coupling between the tuned circuits on the tuning segment 24 may be modified as required. By moving the fingers relative to the tuned circuits and to each other, the total coupling may be varied. It has been found, as was hereinbefore explained, that the addition of the conductive bars to the segments has an appreciable effect on the overall band-width of the tuned circuits. Thus, by augmenting the total coupling between the tuned circuits with the use of these bars with contacting fingers it has been found that the band-width can be made substantially constant over the U. H. F. band of frequencies.

The turret tuner constructed in accordance with the present invention may be made to operate in combination with external circuits of a signal receiver in accordance with well known superheterodyne principles. Thus the several circuits may comprise an input circuit, a link circuit, a mixer circuit, and an oscillator circuit as indicated in Figure 4. By turning the shaft 6, any one of the sixteen segments of the turret may be switched into circuit. Thus, for example, if the channel corresponding to the segment 24 is desired the capacitor 48 and inductor 46 will be switched into the input circuit, tuning it to the desired frequency. The capacitor 58 and the inductors 54 and 56 will, in a like manner, be switched into circuit as a coupling link between the input circuit and the mixer circuit. Similarly the inductors 62 and 66 and the capacitors 64 and 68 will be switched into circuit to complete the tuning of the system to the selected signal channel. By making the segments interchangeable in the turret housing any combination of sixteen channels out of the total of eighty-two may be used.

A high frequency tuner as described herein provides a satisfactory means for tuning a television receiver or the like over a broad frequency band in successive steps or channels. A turret tuner is of relatively simple construction and is readily adapted for constant broad band signal reception requirements. It will be seen that the band-width of the tuned circuits for each channel is made substantially constant over the full frequency range of the television bands by the improved partitioning and segment construction forming coupling loops through the turret.

What is claimed is:

1. A rotary tuning structure for signal receiving apparatus operative over a relatively wide range of signal frequencies comprising a control shaft adapted for rotation about a longitudinal axis, a plurality of conductive shielding elements supported by said shaft and extending radially from said shaft to provide a series of shielded compartments about said axis, a plurality of insulating strips supported between the peripheral ends of said element and covering said compartments, means providing electrical contacts on one surface of each of said strips, frequency determining circuit elements including inductors connected with certain of said contacts and mounted on and along the opposite surface of each of said strips in predetermined inductive coupling relation, a plurality of spaced conductive bars carried by and extending transversely across each of said strips between certain of said inductors, means at the ends of said bars providing contact with adjacent conductive shielding elements, the combination of pairs of said bars and said shielding elements establishing an inductive loop effective to modify the inductive coupling between said circuit elements and to maintain the band-width of said tuning structure substantially constant over said frequency range.

2. A turret-type tuner for signal receiving apparatus operative over a wide range of signal frequencies, comprising a control shaft mounted for rotation about an axis, means providing a plurality of shielded compartments about said axis, a flat insulating strip supported in one of said compartments, a predetermined number of frequency determining circuit elements including tuning inductors mounted on said strip, at least a pair of spaced conductive bars carried by said strip transversely thereof and between certain of said inductors, and means at the end of said bars porviding contact with opposite sides of said one of said compartments and an inductive loop connection therewith through said bars effective to modify the inductive coupling between said circuits whereby the band-width of said tuner is maintained substantially constant over said frequency range.

3. A turret-type tuner for television receivers operative over a relatively wide range of signal frequencies comprising the combination of rotary tuning strip carrier means, means dividing said carrier into shielded compartments having conductive walls, a plurality of tuning strips supported between said walls and covering said compartments, signal circuit tuning and coupling elements carried by said strips, and means including a plurality of conductive bars carried by said strips transversely thereof and between certain of said circuit tuning and coupling elements and in contact with adjacent pairs of said walls to impart additional circuit coupling in said tuning strips and substantially a constant band-width frequency response thereto over said frequency range.

4. A rotary tuning structure for signal receiving apparatus operative over a relatively wide range of signal frequencies comprising a control shaft mounted for rotation about a longitudinal axis, a pair of conductive shielding elements extending radially from said shaft to provide a shielding compartment about said axis, an insulating strip supported between said shielding elements, means providing electrical contacts on said strip, frequency determining circuit elements connected with certain of said contacts, means including a plurality of adjustable conductive bars carried by said strip between certain of said circuit elements, and means at the ends of said bars providing contact with each of said shielding elements to maintain the band-width of said structure substantially constant over said frequency range.

5. The combination as defined in claim 4 wherein the relative positions of said contacting bars on said strip is variable.

6. The combination as defined in claim 4 wherein said contacts extend from one surface of said strip and said circuit elements and said bars are mounted on the other surface of said strip.

7. In a tuning structure of the class described the combination comprising a shaft mounted for rotation about an axis, a pair of shielding elements supported by said shaft along said axis and radially extending therefrom, an insulating strip supported between said shielding elements, a plurality of tunable circuits mounted on said strip in predetermined inductive coupling relation, a predetermined number of spaced conductive elements carried by and along said strip between said tunable circuits, and means at the ends of said conductive elements providing contact with said shielding elements to modify the inductive coupling between said tunable circuits and to maintain the band-width of said structure substantially constant.

8. The combination as defined in claim 7 wherein said tunable circuits provide tuning response to U. H. F. television broadcast signals in a predetermined channel.

9. A rotary tuning structure for signal receiving apparatus operative over a relatively wide range of signal frequencies comprising a pair of spaced end support plates, a control shaft mounted between said plates and adapted for rotation about a longitudinal axis, a plurality of conductive shielding elements between and connected with said end plates extending radially from said shaft substantially equally to provide a series of shielded compartments about said axis, a plurality of flat insulating strips supported between the peripherial ends of said shielding elements and covering said compartments, means providing electrical contacts on one surface of each of said strips, frequency determining circuit elements including inductors connected with certain of said contacts and mounted on and along the opposite surface of each of said strips in predetermined inductive coupling relation, a plurality of spaced conductive bars carried by and extending transversely across each of said strips between certain of said inductors, and means at the ends of said bars providing contact with adjacent pairs of said shielding elements, the combination of pairs of said bars and adjacent shielding elements connected by said bars establishing inductive loops effective to modify the inductive coupling between said circuit elements and to maintain the band-width of said tuning structure substantially constant over said frequency range.

10. A rotary tuning structure for signal receiving apparatus operative over a wide range of signal frequencies comprising a pair of spaced end support plates, a control shaft mounted between said plates and adapted for rotation about a longitudinal axis, a pair of substantially rectangular conductive metal shielding elements between and connected with said end plates extending radially from said shaft to provide a shielded compartment about said axis, a flat insulating strip supported between the peripherial ends of said shielding elements and covering said compartment, means providing electrical contacts on one surface of said strip, frequency determining circuit elements connected with certain of said contacts and mounted on and along the opposite surface of said strip in predetermined inductive coupling relation, means including a plurality of spaced conductive bars carried by and extending transversely across said strip, and means at the ends of said bars providing contact with each of said shielding elements effective to modify the inductive coupling between said circuit elements and to maintain the band-width of said structure substantially constant over said frequency range.

11. A rotary tuning structure for signal receiving apparatus operative over a relatively wide range of signal frequencies comprising a pair of spaced end support plates, a control shaft mounted between said plates and adapted for rotation about a longitudinal axis, a plurality of conductive shielding elements between and connected with said end plates extending radially from said shaft substantially equally to provide a series of shielded compartments about said axis, a planar insulating strip supported between the opposite sides and covering one of said compartments, means providing electrical contacts on one surface of said strip, means providing a plurality of inductively coupled tuned circuits, said last means comprising frequency determining circuit elements including inductors connected with certain of said contacts and mounted on the opposite surface of said strip, a plurality of spaced adjustable conductive bars carried by and extending transversely across said strip between certain of said tuned circuits, and means at the ends of said bars providing contact with the sides of said one of said compartments, the combination of pairs of said bar and opposite sides of said compartments establishing an inductive loop effective to vary the inductive coupling between said tuned circuits and to maintain the band-width of said structure substantially constant over said frequency range.

12. A turret-type tuner operative over a relatively wide range of signal frequencies comprising a band control shaft adapted for rotation about an axis, a plurality of shielded compartments having conductive walls supported by said shaft and adapted for rotation therewith about said axis, a flat insulating strip supported between the walls of one of said compartments, means providing a predetermined number of frequency determining circuits mounted on said strip in predetermined inductive coupling relation, a pair of conductive substantially rectangular bars carried by and extending transversely across said strip between certain of said circuits, and means at the ends of each of said bars providing contacts with adjacent walls of said compartments to vary the inductive coupling between said circuits and to maintain the band-width of said tuner substantially constant over said frequency range.

13. The combination as defined in claim 11 wherein said bars are adjustable with respect to said circuits whereby the inductive coupling between said circuits may be varied between predetermined limits.

References Cited in the file of this patent

UNITED STATES PATENTS

| | | |
|---|---|---|
| 2,078,909 | Gunther | Apr. 27, 1937 |
| 2,545,681 | Zepp et al. | Mar. 20, 1951 |